US005409627A

United States Patent [19]

Boskamp et al.

[11] Patent Number: 5,409,627

[45] Date of Patent: Apr. 25, 1995

[54] PARTICULATE BLEACHING DETERGENT COMPOSITIONS CONTAINING ZEOLITE MAP AND A STABLE BLEACH CATALYST

[75] Inventors: Jelles V. Boskamp, Vlaardingen, Netherlands; Paul A. Chapple, Clwyd, Great Britain; Marten R. van Vliet, Rotterdam, Netherlands

[73] Assignee: Lever Brothers Company, Division of Conopco, Inc., New York, N.Y.

[21] Appl. No.: 214,925

[22] Filed: Mar. 17, 1994

[30] Foreign Application Priority Data

Mar. 18, 1993 [GB] United Kingdom .............. 9305599.4

[51] Int. Cl.$^6$ ......................... C09K 15/02; C11D 3/12; C11D 3/395; D06L 3/02

[52] U.S. Cl. ......................................... 252/102; 8/111; 252/90; 252/97; 252/98; 252/99; 252/174; 252/174.14; 252/174.21; 252/186.27; 252/186.31; 252/397; 252/400.53; 252/524; 252/542; 252/550; 252/174.25

[58] Field of Search ................. 8/111; 252/90, 97, 98, 252/99, 102, 174, 174.14, 174.21, 174.25, 186.27, 186.31, 397, 400.53, 524, 542, 550

[56] References Cited

U.S. PATENT DOCUMENTS

| | | | |
|---|---|---|---|
| 5,227,084 | 7/1993 | Martens et al. | 252/95 |
| 5,238,594 | 8/1993 | Chapple | 252/95 |
| 5,244,594 | 9/1993 | Favre et al. | 252/186.33 |
| 5,246,612 | 9/1993 | van Dijk | 252/102 |
| 5,259,981 | 11/1993 | Chapple | 252/95 |
| 5,259,982 | 11/1993 | Chapple | 252/95 |
| 5,314,635 | 5/1994 | Hage | 252/102 |

FOREIGN PATENT DOCUMENTS

| | | |
|---|---|---|
| 0340013 | 11/1989 | European Pat. Off. . |
| 0367339 | 5/1990 | European Pat. Off. . |
| 0384070 | 8/1990 | European Pat. Off. . |
| 0390251 | 10/1990 | European Pat. Off. . |
| 0420317 | 4/1991 | European Pat. Off. . |
| 0458397 | 11/1991 | European Pat. Off. . |
| 0533492 | 9/1992 | European Pat. Off. . |
| 0544490 | 6/1993 | European Pat. Off. . |
| 0544491 | 6/1993 | European Pat. Off. . |
| 0546815 | 6/1993 | European Pat. Off. . |
| 0549271 | 6/1993 | European Pat. Off. . |
| 0549272 | 6/1993 | European Pat. Off. . |
| 0544492 | 8/1993 | European Pat. Off. . |
| 2123044 | 1/1994 | United Kingdom . |
| 92/06163 | 4/1992 | WIPO . |

*Primary Examiner*—Dennis Albrecht
*Attorney, Agent, or Firm*—James J. Farrell

[57] ABSTRACT

A particulate bleaching detergent composition, preferably having a bulk density of at least 700 g/l, comprises an organic surfactant system, a zeolite builder and a bleach system. The bleach system includes a peroxy bleach compound, and a transitional metal catalyst which comprises a source of Mn and/or Fe ions and a defined macrocyclic organic ligand. The zeolite is zeolite P having a silicon to aluminum ratio not exceeding 1.33 (zeolite MAP). The compositions show improved stability of the bleach catalyst against discoloration on storage, as compared with similar compositions containing conventional zeolite A.

10 Claims, No Drawings

PARTICULATE BLEACHING DETERGENT COMPOSITIONS CONTAINING ZEOLITE MAP AND A STABLE BLEACH CATALYST

TECHNICAL FIELD

The present invention is concerned with high-performance particulate heavy duty detergent compositions, particularly those of high bulk density, that combine the desirable attributes of excellent physical detergency, outstanding bleaching power, and good powder properties.

BACKGROUND AND PRIOR ART

Recently the trend in detergent powders has been towards increased bulk density, for example, above 650 g/l, and towards production methods that do not include spray-drying. At the same time the consumer is seeking ever better cleaning performance from the use of more potent ingredients, for example, surfactants having improved oily soil detergency, some of which are mobile liquids and difficult to incorporate in particulate compositions without leading to a deterioration in flow properties and delivery and dispersion problems in the wash: these difficulties tend to be greater in higher-bulk-density powders than in conventional spray-dried lower-bulk density powders.

Another area where the consumer demands high performance is bleaching and stain removal, especially at low wash temperatures. Many bleaching ingredients are sensitive to moisture and tend to decompose on prolonged storage, and this tendency is exacerbated in high bulk density powders where components are forced into greater proximity. Bleach stability is a particular problem in powders containing zeolite which has a high content of relatively mobile water. It is also a particular problem for bleach systems based on sodium percarbonate, which is considerably less stable to moisture than are sodium perborate monohydrate or tetrahydrate.

EP 522 726A (Unilever) discloses bleaching detergent compositions having much improved sodium percarbonate stability, in which zeolite 4A has been replaced by zeolite P having a silicon to aluminium ratio not exceeding 1.33 (zeolite MAP). Zeolite MAP is described and claimed in EP 384 070A (Unilever).

Our copending application EP 533 492A filed on 24 Nov. 1992 and published on 2 Jun. 1993 describes and claims a high-performance particulate detergent composition of high bulk density that combines a number of desirable attributes. Excellent physical detergency is assured by means of a relatively high level (15–50 wt %) of a high-performance surfactant system—ethoxylated nonionic surfactant having a low (≦6.5) degree of ethoxylation (60–100 wt % of the surfactant system) and optional primary alkyl sulphate (0–40 wt % of the surfactant system)—and a builder system based on zeolite (20–60 wt % of the composition), preferably zeolite MAP, which also gives good powder properties despite the high level of relatively mobile surfactant.

The present inventors have now discovered that these compositions, and others containing zeolite MAP, may be still further improved by the inclusion of a high-performance bleach system based on a transition metal catalyst.

The transition metal bleach catalysts, which are manganese complexes, are described and claimed in EP 458 397A, EP 458 398A and EP 509 787A (Unilever), the last-mentioned document disclosing their use in high bulk density detergent powders. The catalysts are presented in granular form for incorporation into detergent powders. However, stability problems have been found when incorporating these catalysts into detergent powders built with zeolite, especially those of high bulk density, in that the catalyst granules tend to discolour severely on storage, appearing black (and thus highly unattractive) to the consumer.

The present inventors have found that the tendency to discoloration on storage of these catalyst granules is significantly reduced if conventional zeolite A is replaced by zeolite MAP.

It has also be found that, if zeolite A is replaced by zeolite MAP, storage-stable detergent compositions of high bulk density containing the transition metal catalyst in conjunction with sodium percarbonate bleach may be formulated. This was previously impracticable because of the instability of sodium percarbonate in the presence of zeolite A. Thus the present invention makes it possible to formulate stable detergent compositions containing an extremely potent, yet environmentally favourable, bleach system which is stable on storage.

Our copending application EP 552 054A, filed on 15 Jan. 1993 and published on 21 Jun. 1993, discloses a high bulk density detergent powder containing zeolite MAP and containing sodium percarbonate having a protective coating.

DEFINITION OF THE INVENTION

The subject of the present invention is a particulate bleaching detergent composition, preferably having a bulk density of least 700 g/l, the composition comprising:

(a) from 15 to 50 wt % of an organic surfactant system, (b) from 10 to 80 wt % (anhydrous basis) of crystalline aluminosilicate builder comprising zeolite P having a silicon to aluminium ratio not exceeding 1.33 (zeolite MAP);.

(c) a bleach system comprising a peroxy bleach compound (preferably sodium percarbonate optionally together with a bleach activator), and a bleach catalyst comprising a source of Mn and/or Fe ions and a ligand which is a macrocyclic organic compound of formula I:

$$[NR^3-(CR^1(R^2)_u)_t]_s \qquad (I)$$

wherein t is an integer from 2 to 3; s is an integer from 3 to 4, u is zero or one; and $R^1$, $R^2$ and $R^3$ are each independently selected from H, alkyl and aryl, both optionally substituted;

(d) optionally other detergent ingredients to 100 wt %.

DETAILED DESCRIPTION OF THE INVENTION

The particulate bleaching detergent composition of the invention has three essential components: the surfactant system, the crystalline aluminosilicate (zeolite), and the bleach system.

The Surfactant System (a)

The detergent compositions of the invention will contain, as essential ingredients, one or more detergent-active compounds (surfactants) which may be chosen from soap and non-soap anionic, cationic, nonionic, amphoteric and zwitterionic detergent-active compounds, and mixtures thereof.

Many suitable detergent-active compounds are available and are fully described in the literature, for example, in "Surface-Active Agents and Detergents", Volumes I and II, by Schwartz, Perry and Berch.

The preferred detergent-active compounds that can be used are soaps and synthetic non-soap anionic and nonionic compounds.

Anionic surfactants are well-known to those skilled in the art. Examples include alkylbenzene sulphonates, particularly linear alkylbenzene sulphonates having an alkyl chain length of $C_8$–$C_{15}$; primary and secondary alkyl sulphates, particularly $C_{12}$–$C_{15}$ primary alkyl sulphates; alkyl ether sulphates; olefin sulphonates; alkyl xylene sulphonates; dialkyl sulphosuccinates; and fatty acid ester sulphonates. Sodium salts are generally preferred.

Nonionic surfactants that may be used include the primary and secondary alcohol ethoxylates, especially the $C_8$–$C_{20}$ primary and secondary aliphatic alcohols ethoxylated with an average of from 1 to 20 moles of ethylene oxide per mole of alcohol, and more especially the $C_9$–$C_{15}$ primary aliphatic alcohols ethoxylated with an average of from 1 to 10 moles of ethylene oxide per mole of alcohol.

Also of interest are non-ethoxylated nonionic surfactants, for example, alkylpolyglycosides; O-alkanoyl glucosides as described in EP 423 968A (Unilever); and polyhydroxyamides.

The present invention is especially concerned with compositions containing a high level of a high-performance surfactant system. At least 15 wt % of the composition is constituted by the surfactant, and as much as 50 wt % may be present. Compositions may advantageously contain at least 17 wt %, and more advantageously at least 20 wt %, of the surfactant system.

Preferred compositions contain at least 10 wt % of an ethoxylated nonionic surfactant, and/or at least 5 wt % of a primary alcohol sulphate.

An especially preferred surfactant system consists essentially of ethoxylated alcohol nonionic surfactant, optionally together with a minor proportion (not exceeding 40 wt % of the surfactant system) of primary alkyl sulphate.

According to a preferred embodiment of the invention, therefore, the surfactant system (b) consists essentially of:

(i) nonionic surfactant which is an ethoxylated primary $C_8$–$C_{18}$ alcohol (from 60 to 100 wt % of the surfactant system), and (ii) optional primary $C_8$–$C_{18}$ alkyl sulphate (from 0 to 40 wt % of the surfactant system).

The proportion of primary alkyl sulphate preferably does not exceed 35 wt % (of the surfactant system), and more preferably does not exceed 30 wt % of the surfactant system. Preferred proportions of alkyl sulphate in the surfactant system are from 0.1 to 35 wt %, more preferably from 5 to 35 wt %, and advantageously from 10 to 30 wt %.

Preferably, the ethoxylated alcohol nonionic surfactant employed in the detergent compositions of the present invention has a relatively low degree of ethoxylation, in the range of from 2.5 to 8.0, and advantageously not exceeding 6.5.

A mixture of differently ethoxylated materials may be used, provided that the overall degree of ethoxylation meets the stated requirements.

The HLB value of the nonionic surfactant preferably does not exceed 11.0, and more preferably does not exceed 10.5. Desirably the HLB value is within the range of from 9.5 to 10.5.

The chain length of the ethoxylated alcohol may generally range from $C_8$ to $C_{18}$, preferably from $C_{12}$ to $C_{16}$; an average chain length of $C_{12-15}$ is preferred. Especially preferred is ethoxylated alcohol consisting wholly or predominantly of $C_{12}$–$C_{14}$ material.

The ethoxylated alcohol is preferably primary, but secondary alcohol ethoxylates could in principle be used. The alcohol is preferably wholly or predominantly straight-chain. Suitable alcohols are vegetable-derived, for example, coconut, which is the most preferred material. Among the synthetic alcohols, Ziegler alcohols are preferred to oxo-based alcohols.

The primary alcohol sulphate (PAS) that may optionally be present, constituting up to 40 wt % of the preferred surfactant system, may have a chain length in the range of $C_8$–$C_{18}$, preferably $C_{12}$–$C_{16}$, with a mean value preferably in the $C_{12-15}$ range. Especially preferred is PAS consisting wholly or predominantly of $C_{12}$–$C_{14}$ material.

If desired, mixtures of different chain lengths may be used as described and claimed in EP 342 917A (Unilever).

As for the ethoxylated alcohol, predominantly or wholly straight-chain material, is preferred. PAS of vegetable origin, and more especially PAS from coconut oil (cocoPAS) is especially preferred. However, it is also within the scope of the invention to use branched PAS as described and claimed in EP 439 316A (Unilever).

The PAS is present in the form of the sodium or potassium salt, the sodium salt generally being preferred.

The Zeolite Detergency Builder (b)

The amount of zeolite builder in the compositions of the invention may range from 10 to 80 wt %, preferably from 20 to 60 wt %, usually from 25 to 55 wt % and suitably, in a heavy duty detergent composition, from 25 to 48 wt %.

The zeolite builder incorporated in the compositions of the invention is zeolite MAP as described and claimed in EP 384 070A (Unilever). Zeolite MAP is defined as an alkali metal aluminosilicate of the zeolite P type having a silicon to aluminium ratio not exceeding 1.33.

The silicon to aluminium ratio preferably lies within the range of from 0.90 to 1.33, and more preferably within the range of from 0.90 to 1.20. Especially preferred is zeolite MAP having a silicon to aluminium ratio not exceeding 1.15, and more preferably not exceeding 1.07. The calcium binding capacity of zeolite MAP is generally at least 150 mg CaO per g of anhydrous material.

In the present invention, the use of zeolite MAP has two advantages quite independent of its greater building efficacy: it enables higher total surfactant levels, and more nonionic-rich surfactant systems, to be used without loss of powder flow properties; and it gives improved bleach stability.

Preferred zeolite MAP for use in the present invention is especially finely divided and has a $d_{50}$ (as defined below) within the range of from 0.1 to 5.0 microns, more preferably from 0.4 to 2.0 microns and most preferably from 0.4 to 1.0 microns The quantity "$d_{50}$" indicates that 50 wt % of the particles have a diameter smaller than that figure, and there are corresponding quantities "$d_{80}$", "$d_{90}$" etc. Especially preferred materials have a $d_{90}$ below 3 microns as well as a $d_{50}$ below 1 micron.

The zeolite may, if desired, be used in conjunction with other inorganic or organic builders. Inorganic builders that may be present include sodium carbonate, if desired in combination with a crystallisation seed for calcium carbonate, as disclosed in GB 1 437 950 (Unilever). Organic builders that may be present include polycarboxylate polymers such as polyacrylates, acrylic/maleic copolymers, and acrylic phosphinates; monomeric polycarboxylates such as citrates, gluconates, oxydisuccinates, glycerol mono-, di- and trisuccinates, carboxymethyloxysuccinates, carboxymethyloxymalonates, dipicolinates, hydroxyethyliminodiacetates, alkyl- and alkenylmalonates and succinates; and sulphonated fatty acid salts. This list is not intended to be exhaustive.

Preferred supplementary builders for use in conjunction with zeolite include citric acid salts, more especially sodium citrate, suitably used in amounts of from 3 to 20 wt %, more preferably from 5 to 15 wt %. The combination of zeolite MAP with citrate as a detergency builder system is described and claimed in EP 448 297A (Unilever).

Also preferred are polycarboxylate polymers, more especially acrylic/maleic copolymers, suitably used in amounts of from 0.5 to 15 wt %, especially from 1 to 10 wt %, of the detergent composition; the combination of zeolite MAP with polymeric builders is described and claimed in EP 502 675A (Unilever).

The Bleach System (c)

The bleach system of the detergent compositions of the invention contains as essential ingredients a peroxy bleach compound, and a bleach catalyst.

The Peroxy Bleach Compound

The compositions of the invention contain an inorganic or organic peroxy bleach compound capable of yielding hydrogen peroxide in aqueous solution.

Peroxy bleach compounds suitable for use in the compositions of the invention include organic peroxides such as urea peroxide, and inorganic persalts, such as the alkali metal perborates, percarbonates, perphosphates, persilicates and persulphates. Mixtures of two of more such compounds may also be suitable.

The peroxy bleach compound is suitably present in an amount of from 5 to 35 wt %, preferably from 10 to 25 wt %.

The peroxy bleach compound may be an inorganic or organic persalt, optionally in conjunction with a bleach activator (bleach precursor) to improve bleaching action at low wash temperatures. Preferred inorganic persalts are sodium perborate monohydrate and tetrahydrate, and, most preferably, sodium percarbonate.

Especially preferred is sodium percarbonate having a protective coating against destabilisation by moisture. The protective coating preferably comprises one or more salts selected from sodium borates (especially sodium metaborate), sodium silicate, and sodium citrate.

Sodium percarbonate having a protective coating. comprising sodium metaborate and sodium silicate is disclosed in GB 2 123 044B (Kao), while EP 546 815A (Unilever) filed on 9 Dec. 1992 and published on 16 Jun. 1993 claims sodium percarbonate having a protective coating comprising sodium citrate.

The inorganic persalt is advantageously used in conjunction with a bleach activator (bleach precursor). The bleach precursor is suitably present in an amount of from 1 to 8 wt %, preferably from 2 to 5 wt %.

Preferred bleach precursors are peroxycarboxylic acid precursors, more especially peracetic acid precursors and peroxybenzoic acid precursors; and peroxycarbonic acid precursors.

Examples of peroxyacid bleach precursors suitable for use in the present invention include:

N,N,N',N'-tetracetyl ethylenediamine (TAED);
2-(N,N,N-trimethylammonium) ethyl sodium-4-sulphophenyl carbonate chloride (SPCC), also known as cholyl-p-sulphophenyl carbonate (CSPC);
sodium nonanoyloxybenzene sulphonate (SNOBS);
sodium 4-benzoyloxybenzene sulphonate (SBOBS);
sodium 3,5,5-trimethylhexanoyloxybenzene sulphonate (STHOBS);
and glucose pentaacetate (GPA).

Instead of a persalt, the peroxy bleach compound may be an inorganic or organic peroxyacid. Inorganic peroxyacids include monopersulphuric acid; and organic peroxyacids include N,N'-phthaloylaminoperoxy caproic acid (PAP), and 1,12-diperoxydodecanedioic acid (DPDA)

A bleach stabiliser (heavy metal sequestrant) may also be present. Suitable bleach stabilisers include ethylenediamine tetraacetate (EDTA) and the polyphosphonates such as Dequest (Trade Mark), EDTMP.

The Bleach Catalyst

The bleach catalyst present in the compositions of the invention is described and claimed in EP 458 397A and EP 458 398A (Unilever), and its use in high bulk density detergent powders is described and claimed in EP 509 787A (Unilever).

The bleach catalyst is defined as comprising a source of Mn and/or Fe ions and a ligand which is a macrocyclic organic compound of formula I:

$$\left[ NR^3-(CR^1(R^2)_u)_t \right]_s \qquad (I)$$

wherein t is an integer from 2 to 3; s is an integer from 3 to 4, u is zero or one; and $R^1$, $R^2$ and $R^3$ are each independently selected from H, alkyl and aryl, both optionally substituted.

Examples of preferred ligands are:

1,4,7-triazacyclononane (TACN);
1,4,7-trimethyl-1,4,7-triazacyclononane (1,4,7-$Me_3$-TACN);
2-methyl-1,4,7-triazacyclononane (2-MeTACN);
1,2,4,7-tetramethyl-1,4,7-triazacyclononane (1,2,4,7-$Me_4$TACN);
1,2,2,4,7-pentamethyl-1,4,7-triazacyclononane (1,2,2,4,7-$Me_5$TACN);
1,4,7-trimethyl-2-benzyl-1,4,7-triazacyclononane; and
1,4,7-trimethyl-2-decyl-1,4,7-triazacyclononane.

Especially preferred is 1,4,7-trimethyl-1,4,7-triazacyclononane (1,4,7-$Me_3$TACN).

The aforementioned ligands may be synthesised by the methods described in K. Wieghardt et al., Inorganic Chemistry 1982, 21, page 3086.

The source of iron and/or manganese ions and ligand may be added separately or in the form of a mono-, di- or tetranuclear manganese or iron complex. When added separately, the ligand may be in the form of an acid salt such as 1,4,7-$Me_3$TACN hydrochloride. The source of iron and manganese ions may be a water soluble salt such as iron or manganese nitrate, chloride, sulphate or acetate or a coordination complex such as manganese acetylacetonate. The source or iron and/or manganese ions should be such that the ions are not too tightly bound, ie all those sources from which the ligand of formula (I), as hereinbefore defined, may extract the Fe and Mn in a wash liquor.

Preferred mononuclear complexes have the formula $[LMn^{IV}(OR)_3]Y$ a)

wherein Mn is manganese in the +4 oxidation state;
R is a $C_1$–$C_{20}$ radical selected from the group alkyl, cycloalkyl, aryl, benzyl and radical combinations thereof;
at least two R radicals may also be connected to one another so as to form a bridging unit between two oxygens that coordinate with the manganese;
L is a ligand of formula (I) as hereinbefore defined;
and Y is an oxidatively-stable counterion;

or the formula $[LMnX_p]^zY_q$ b)

wherein Mn can be either in the II, III or IV oxidation state;
each X independently represents a coordinating species with the exception of $RO^-$, such as $Cl^-$, $Br^-$, $I^-$, $F^-$, $NCS^-$, $N_3^-$, $I_3^-$, $NH_3^-$, $RCOO^-$, $RSO_3^-$, $RSO_4^-$ in which R is alkyl or aryl, both optionally substituted, $OH^-$, $O_2^{2-}$, $HOO^-$, $H_2O$, SH, $CN^-$, $OCN^-$, $S_4^{2-}$ and mixtures thereof;
p is an integer from 1-3;
z denotes the charge of the complex and is an integer which can be positive, zero or negative;
Y is a counterion the type of which is dependent upon the charge z of the complex;
q=z/[charge Y];
and L is a ligand as hereinbefore defined.

Such mononuclear complexes are further described in our copending European Patent Application EP 549 272A, filed on 18 Dec. 1992 and published on 30 Jun. 1993.

Preferred dinuclear complexes have the formula

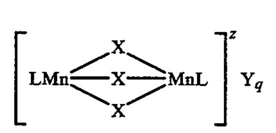

wherein
Mn is manganese which can independently be in the III or IV oxidation state;
X is independently a coordinating or bridging species selected from the group consisting of $H_2O$, $O_2^{2-}$, $OH^-$, $O^{2-}$, $HO_2^-$, $SH^-$, $S^{2-}$, >SO, $Cl^-$, $SCN^-$, $N_3^-$, $RSO_3^-$, $R_3SO_4^-$, RCOO, $NH_2^-$ and $NR_3$, with R being H, alkyl, aryl, both optionally substituted, and $R^1COO$, where $R^1$ is an alkyl or aryl radical, both optionally substituted;
L is a ligand of formula (I) as hereinbefore defined;
z denotes the charge of the complex and is an integer which can be positive or negative, or is zero;
Y is a monovalent or multivalent counterion, leading to charge neutrality, which is dependent upon the charge z of the complex; and
q=z/[charge Y].

The amount of bleach catalyst present in the detergent compositions of the invention is suitably from 0.02 to 0.08 wt %.

The bleach catalyst is advantageously in the form of granules as described and claimed in our British Patent Application No. 93 18296.2 filed on 3 Sep. 1993. These granules comprise:
(i) from 0.5 to 20 wt %, preferably from 1 to 15 wt %, of the catalyst itself,
(ii) from 5 to 90 wt % of a soluble core material, preferably selected from sodium bicarbonate, magnesium and potassium nitrates, and magnesium sulphate,.
(iii) from 5 to 91 wt % of a binding agent selected from silicone oils, fatty acids, fatty esters, tri-, di- and monoglycerides, waxes and solid hydrocarbons.

An especially preferred binding agent is cetostearyl stearate.

Preferably, these granules will also comprise an inert solid. Preferred inert materials include silicas such as Gasil, Aerosil and Sorbosil (Trade Marks); clays such as kaolin; alumina; and titanium dioxide.

Other preferred granules are described and claimed in our British Patent Application No. 93 18295.4 filed on 3 Sep. 1993.

Alternatively, the bleach catalyst may be in the form of granules as described and claimed in our copending application EP 544 440A filed on 18 Nov. 1992 and published on 2 Jun. 1993. These granules comprise:
(i) from 0.5 to 8 wt % of the catalyst itself,
(ii) optionally from 0 to 90 wt % of a inert salt selected from chlorides, carbonates and mixtures thereof, and
(iii) from 5 to 91 wt % of a binding agent selected from water-soluble non-oxidisable polymers, alkali metal silicates, saturated fatty acid soap mixtures, and combinations of these.

A preferred binding agent is sodium silicate, and a preferred inert salt is sodium carbonate.

Preferred granules include catalyst/sodium stearate/-lauric acid granules, and catalyst/sodium carbonate/-sodium silicate/zeolite granules.

Preferably, the manganese catalyst within the granules is of an average particle size as small as possible, preferably below 250 micrometers for proper distribution and to ensure fast delivery to the wash, although particles which are too small may cause handling problems during the granulation process. A preferred and optimum manganese catalyst particle size is within a range of from 50 to 150 micrometers.

Other Ingredients

The compositions in accordance with the invention may contain sodium carbonate, to increase detergency and to ease processing. Sodium carbonate may generally be present in amounts ranging from 1 to 60 wt %, preferably from 2 to 40 wt %, and most suitably from 2 to 13 wt %.

Powder flow may be improved by the incorporation of a small amount of a powder structurant, for example, a fatty acid (or fatty acid soap), a sugar, an acrylate or acrylate/maleate polymer, or sodium silicate.

The preferred powder structurant is fatty acid soap, suitably present in an amount of from 1 to 5 wt %. As will be discussed below in the context of processing, this is preferably incorporated as the free acid and neutralised in situ.

Other materials that may be present in detergent compositions of the invention include sodium silicate; antiredeposition agents such as cellulosic polymers; fluorescers; inorganic salts such as sodium sulphate; lather control agents or lather boosters as appropriate; proteolytic and lipolytic enzymes; dyes; coloured speckles; perfumes; foam controllers; and fabric softening compounds. This list is not intended to be exhaustive.

Preparation of the Detergent Compositions

The particulate detergent compositions of the invention may be prepared by any method suitable for the production of powders of high bulk density, ie at least 700 g/liter and preferably at least 800 g/liter.

Such powders may be prepared either by post-tower densification of spray-dried powder, or by wholly non-tower methods such as dry mixing and granulation; in both cases a high-speed mixer/granulator may advantageously be used.

Processes using high-speed mixer/granulators are disclosed, for example, in EP 340 013A, EP 367 339A, EP 390 251A and EP 420 317A (Unilever).

As is well known to those skilled in the art, the bleach ingredients, including the catalyst granules, should not be subjected to densification or granulation but should be post-added.

EXAMPLES

The invention is further illustrated by the following non-limiting Examples, in which parts and percentages are by weight unless otherwise stated.

In the Examples, the following abbreviations are used:

| | |
|---|---|
| cocoPAS | coconut alcohol sulphate |
| coco 3EO | coconut alcohol ethoxylated with 3 moles of ethylene oxide per mole of alcohol |
| coco 6.5EO | coconut alcohol ethoxylated with 6.5 moles of ethylene oxide per mole of alcohol |
| coco 7EO | coconut alcohol ethoxylated with 7 moles of ethylene oxide per mole of alcohol |
| zeolite A | zeolite A powder: Wessalith P (Trade Mark) ex Degussa |
| zeolite MAP | zeolite MAP powder, as described and claimed in EP 384 070A (Unilever), silicon to aluminium ratio 1.00 |
| percarbonate | sodium percarbonate having a protective coating comprising sodium metaborate and sodium metasilicate, as disclosed in GB 2 123 044B (Kao) |
| TAED | tetraacetylethylene diamine (granules) |
| EDTMP | ethylenediamine tetramethylene phosphonate, Ca salt: Dequest (Trade Mark) ex Monsanto. |

Examples 1 to 4, Comparative Examples A to D

Detergent base powders were prepared by mixing zeolite (A or MAP) with a liquid surfactant blend (26.7 wt % cocoPAS, 33.8 wt % coco 3EO, 33.8 wt % coco 7EO, 5.7 wt % water), in a laboratory-scale granulator. The zeolites had previously been washed with 0.1M sodium chloride solution, dried and reequilibrated with atmospheric moisture.

The base powders were sieved to remove material <250 micrometers and >1700 micrometers, then mixed with manganese catalyst granules and sodium percarbonate to give fully formulated detergent powders having the following formulations:

| | Example 1 | | Example A | |
|---|---|---|---|---|
| | base | whole powder | base | whole powder |
| Zeolite MAP* | 68.20 | 51.15 | — | — |
| Zeolite A* | — | — | 73.30 | 54.98 |
| CocoPAS | 8.49 | 6.37 | 7.13 | 5.35 |
| Coco 3EO | 10.75 | 8.06 | 9.03 | 6.77 |
| Coco 7EO | 10.75 | 8.06 | 9.03 | 6.77 |
| Water | 1.81 | 1.36 | 1.52 | 1.14 |
| Total base | 100.00 | 75.00 | 100.00 | 75.00 |
| Catalyst granules | | 5.00 | | 5.00 |
| Percarbonate | | 20.00 | | 20.00 |
| | | 100.00 | | 100.00 |
| Bulk density of base | | 840 g/l | | 860 g/l |

*hydrated basis

The differences in composition between the two base powders reflect the different carrying capacities of the two zeolites.

The catalyst granules had the following formulation:

| | |
|---|---|
| Catalyst (Mn 1,4,7-$Me_3$TACN) | 1.8 |
| Zeolite MAP | 46.6 |
| Soap/fatty acid* | 20.5 |
| Citric acid | 22.2 |
| Titanium dioxide | 8.9 |
| | 100.0 |

*30% neutralised mixture of $C_{12}$–$C_{18}$ saturated fatty acids (about 60% $C_{12}$, 17% $C_{16}$, 20% $C_{18}$, 3% $C_{10}$ + $C_{14}$).

Samples of each powder were stored in open-topped glass jars at 37° C. and 70% relative humidity. After a period of 28 days, the samples were removed from storage, and pairs of samples of Powders 1 and A were compared visually by a panel of eight assessors, to assess relative discoloration. The results were as follows:

| | |
|---|---|
| Panellists showing a preference for Powder 1 | 8 |
| Panellists showing a preference for Powder A | 0 |

Example 2, Comparative Example B

The procedure of Examples 1 and A was repeated using sodium perborate monohydrate instead of sodium percarbonate. Example 2 contained the base powder of Example 1 (zeolite MAP), and Comparative Example B contained the base powder of Comparative Example A (zeolite A).

| | |
|---|---|
| Panellists showing a preference for Powder 2 | 6 |
| Panellists showing a preference for Powder B | 2 |

Example 3, Comparative Example C

The procedure of Examples 1 and A was repeated using different catalyst granules, having the following composition:

| | |
|---|---|
| Catalyst (Mn 1,4,7-$Me_3$TACN) | 2.0 |
| Cetocetylstearate | 31.0 |
| Silica* | 26.4 |
| Sodium bicarbonate | 39.6 |
| Titanium dioxide | 1.0 |
| | 100.0 |

*Gasil (Trade Mark) 200TP ex Crosfield.

Example 3 contained 75 wt % of the base powder of Example 1 (zeolite MAP), and Comparative Example C contained 75 wt % of the base powder of Comparative Example A (zeolite A). Each powder also contained 20 wt % of coated sodium percarbonate as in Examples 1 and A, and 5 wt % of the catalyst granules. The panel assessment results were as follows:

| | |
|---|---|
| Panellists showing a preference for Powder 3 | 8 |
| Panellists showing a preference for Powder C | 0 |

Example 4, Comparative Example D

The procedure of Examples 3 and C was repeated using sodium perborate monohydrate (20 wt %) in place of the coated sodium percarbonate. Example 4 contained the base powder of Example 1 (zeolite MAP), and Comparative Example D contained the base powder of Comparative Example A (zeolite A). The panel assessment results were as follows:

| | |
|---|---|
| Panellists showing a preference for Powder 4 | 8 |
| Panellists showing a preference for Powder D | 0 |

Example 5, Comparative Example E

This Example describes an accelerated storage test to show the effect of zeolite type on the decomposition of the manganese catalyst Mn 1,4,7-$Me_3$TACN. In this test, the catalyst, not in granular form, was in direct contact with zeolitic base powder.

Crystalline catalyst was granulated with nonionic surfactant and zeolite to give the following compositions:

| | Example 5 | Example E |
|---|---|---|
| Catalyst | 1.80 | 1.96 |
| Zeolite MAP | 69.15 | — |
| Zeolite A | — | 75.42 |
| Nonionic 7EO* | 29.05 | 22.62 |
| | 100.00 | 100.00 |

*$C_{12-15}$ oxo alcohol, 7EO: Synperonic (Trade Mark) A7 ex ICI.

As in earlier Examples, the different compositions reflected the different liquid carrying capacities of the two zeolites.

The granules were stored at 37° C. and 70% relative humidity and their colour assessed visually at regular time intervals.

The granules of Comparative Example E showed brown discoloration after storage times as short as 16 hours. The granules of Example 5 showed no discoloration after 16 hours, and remained essentially unchanged for 1 week or more.

Examples 6 and 7

Detergent powders having a bulk density above 800 g/liter were prepared to the formulations given below (in weight percent), by a non-tower process comprising mixing and granulating the surfactants and builders in a Lödige (Trade Mark) continuous high-speed mixer/-granulator, and postdosing the remaining ingredients.

The sodium percarbonate was a coated material having a coating based on sodium metaborate and sodium metasilicate as described in GB 2 123 044B (Kao).

The powders were free-flowing and gave excellent detergency and bleaching performance on a wide range of soils.

| | 6 | 7 |
|---|---|---|
| CocoPAS | 6.42 | 6.42 |
| Coco 6.5EO | 6.42 | 6.42 |
| Coco 3EO | 8.15 | 8.15 |
| Soap | 2.22 | 2.22 |
| Zeolite MAP (as anhydrous) | 37.80 | 37.80 |
| Sodium carbonate | 1.24 | 1.24 |
| Sodium carboxymethyl cellulose | 0.99 | 0.99 |
| Moisture and salts | 4.20 | 4.20 |
| Total base | 68.69 | 68.69 |
| Sodium silicate | 3.66 | 2.01 |
| Citric acid | — | 2.00 |
| Sodium percarbonate (coated) | 16.31 | 16.31 |
| TAED granules | 3.75 | 3.75 |
| EDTMP | 0.37 | 0.37 |
| Mn catalyst granules (2% active) | 1.91 | 1.91 |
| Antifoam granules | 3.00 | 3.00 |
| Enzyme granules | 1.75 | 1.40 |
| Perfume | 0.56 | 0.56 |
| | 100.00 | 100.00 |

We claim:

1. A particulate bleaching detergent composition comprising:

(a) from 15 to 50 wt. % of an organic surfactant system;

(b) from 10 to 80 wt. % (anhydrous basis) of a crystalline aluminosilicate comprising zeolite P having a silicon to aluminium ratio not exceeding 1.33 (zeolite MAP) said zeolite MAP having a $d_{50}$ of 0.1 to 5.0 microns;

(c) a bleach system comprising a peroxy bleach compound in an amount of 5 to 35 wt. % and a bleach catalyst in an amount of 0.02 to 0.08 wt. % comprising a source of Mn and/or Fe ions and a ligand which is a macrocyclic organic compound of formula I:

$$[NR^3-(CR^1(R^2)_u)_t]_s \quad (I)$$

wherein t is an integer from 2 to 3; s is an integer from 3 to 4, u is zero or one; and $R^1$, $R^2$ and $R^3$ are each independently selected from H, alkyl and aryl, both optionally substituted wherein said bleach catalyst has a substantially reduced tendency to discoloration on storage.

2. A detergent composition as claimed in claim 1, wherein the zeolite MAP has a silicon to aluminium ratio not exceeding 1.15.

3. A detergent composition as claimed in claim 1, wherein the ligand of the bleach catalyst is 1,4,7-trimethyl-1,4,7-triazacyclononane (1,4,7-$Me_3$TACN).

4. A detergent composition as claimed in claim 1, wherein the bleach system (c) comprises as peroxy bleach compound sodium percarbonate.

5. A detergent composition as claimed in claim 1, wherein the surfactant system (a) comprises at least 10 wt % (based on the whole composition) of ethoxylated nonionic surfactant.

6. A detergent composition as claimed in claim 1, wherein the surfactant system (a) comprises at least 5 wt % (based on the whole composition) of primary alcohol sulphate.

7. A detergent composition as claimed in claim 1, wherein the surfactant system (a) consists essentially of:

(i) ethoxylated nonionic surfactant which is a primary $C_8$–$C_{18}$ alcohol (from 60 to 100 wt % of the surfactant system), and (ii) optional primary $C_8$–$C_{18}$ alkyl sulphate (from 0 to 40 wt % of the surfactant system).

8. A detergent composition as claimed in claim 7, wherein the ethoxylated nonionic surfactant (i) has an average degree of ethoxylation within the range of from 2.5 to 8.0.

9. A detergent composition as claimed in claim 1, which contains from 20 to 60 wt % of zeolite MAP.

10. A detergent composition as claimed in claim 1, having a bulk density of at least 700 g/1.

* * * * *